Aug. 9, 1966  W. E. GARWOOD  3,265,613
METHOD FOR UPGRADING HYDROCARBON OILS
Filed April 16, 1963  2 Sheets-Sheet 1

INVENTOR.
William E. Garwood
BY
*Raymond W. Barclay*
ATTORNEY

FIG.3

3,265,613
METHOD FOR UPGRADING HYDROCARBON OILS
William E. Garwood, Haddonfield, N.J., assignor to Mobil Oil Corporation, a corporation of New York
Filed Apr. 16, 1963, Ser. No. 273,515
20 Claims. (Cl. 208—213)

This application is a continuation-in-part of applicant's copending application Serial No. 83,412, filed January 18, 1961, now abandoned.

This invention relates to a method for converting and upgrading hydrocarbon oils. More particularly, the present invention is directed to a catalytic processing operation wherein a petroleum charge stock to be upgraded is brought into contact under specified conditions with a crystalline aluminosilicate of the type commonly known as a molecular sieve having a volatile treating agent encased within its crystal structure. The present invention is directed to an improved cyclic conversion process wherein the hydrocarbon oil to be upgraded is contacted with a volatile treating agent encased in an aluminosilicate of the type commonly referred to as a molecular sieve. The effluent mixture of the initial contact containing some of the volatile treating agent and the hydrocarbon oil product is passed through a second molecular sieve which contains no volatile treating agent at the beginning of the operation but which adsorbs the volatile treating agent portion of the effluent. The process can then be reversed utilizing the second molecular sieve containing the adsorbed volatile treating agent as the initial contact and the initial molecular sieve can be used as the collector to adsorb the resulting volatile treating agent effluent.

The term "upgrading of hydrocarbon oils" is meant in its broadest sense and includes hydroprocessing operations for reducing the content of nitrogen, sulfur, oxygen or heavy metals in the hydrocarbon oil, and also includes hydrogenation operations to improve the burning qualities of a fuel oil, and conversion processes which include dehydrogenation reactions for forming hydrocarbons having a higher carbon to hydrogen ratio.

The presence of nitrogen, sulfur, oxygen and certain heavy metals in petroleum crude and fractions thereof has heretofore been recognized as undesirable. Petroleum hydrocarbons generally contain varying amounts of nitrogen compounds as impurities, which are distributed in the various fractions and products obtained from the crude hydrocarbon stocks according to their boiling points or to their relative volatility in hydrocarbon mixtures. Also, the particular kind and amounts of nitrogen compounds present in a petroleum hydrocarbon vary with the previous manufacturing and processing operations to which said petroleum hydrocarbon has been subjected. The presence of nitrogen compounds in hydrocarbon oils is objectionable since they tend to destroy the activity of hydrocarbon conversion catalysts with which the oil may be brought into contact during various processing operations. Thus, in catalytic cracking of a hydrocarbon oil containing an appreciable amount of nitrogen compounds, the catalyst prematurely loses activity due to the poisoning effects of the nitrogen compounds. Sulfur occurs in petroleum stock generally in two principal forms, as mercaptans and as part of ring type compounds such as thiophene. The particular kind and amount of sulfur compound present in a petroleum hydrocarbon also varies with the source and previous processing, if any, to which said petroleum hydrocarbon has been subjected. While non-refractory sulfur compounds, such as mercaptans, can be effectively removed by various treating operations, the removal of refractory sulfur compounds of the ring type has been much more difficult. These compounds, as is well known, are highly objectionable in hydrocarbon oils because of their bad odor and corrosive tendencies. Oxygen compounds may be present in petroleum stocks either as virgin material or as a result of reaction of hydrocarbons with oxygen of the air during handling and processing of the oils. The presence of oxygen in hydrocarbon charge stocks undergoing catalytic processing with a solid porous catalyst, particularly under conditions of high pressure, is extremely detrimental since the same tends to destroy the surface area of the catalyst. The presence of heavy metals in hydrocarbon charge stocks undergoing catalytic processing with a solid porous catalyst is extremely detrimental since the metals tend to coat the active surface area of the catalyst and have an adverse effect upon the activity and selectivity of the catalyst.

Among the dehydrogenation reactions which can be conducted utilizing the present invention are the conversion of paraffins to olefins and diolefins, of olefins to diolefins; dehydrocyclization reactions such as paraffins to aromatics; and other reactions in which organic compounds are converted to other compounds having a higher carbon-to-hydrogen ratio. These reactions proceed, generally, with astonishing efficiency at the preferred reaction conditions.

The difficulty associated with processes of this type heretofore mentioned is the recovery of the expensive volatile treating agents used as catalytic agents. According to the present invention a cyclic process is utilized wherein the volatile treating agent is continuously recovered and reused.

It is the object of this invention to provide an improved cyclic process for upgrading hydrocarbon oils. A further objective is to provide a commercially attractive process capable of removing objectionable materials from hydrocarbon oils containing the same. A further objective is to provide a commercially attractive process capable of upgrading hydrocarbon oils and simultaneously providing a unique system to effect a high recovery of the treating agent utilized in the hydrocarbon conversion process.

The above and other objective which will be apparent to those skilled in the art are achieved in accordance with the present invention. Broadly, the processes described herein involve in their initial phase treating a hydorcarbon oil at temperatures at the range of about 400–1400° F. in the presence of a molecular sieve material which has undergone prior treatment to encase within the crystal structure thereof an effective amount, and generally between about one and about sixty percent by weight, of a volatile treating agent. In the conversion of the hydrocarbon, an effluent is obtained which includes the hydrocarbon product and the volatile treating agent or compounds thereof which pass from the molecular sieve in the primary contact zone. This effluent is then passed into a secondary contact zone containing a molecular sieve which is initially free of the volatile treating agent maintained at temperatures in the range from about 50° F. to about 300° F. where the volatile treating agent is then adsorbed and becomes encased in the molecular sieve of the secondary contact zone. These contacting conditions are maintained until the volatile treating agent content in the molecular sieve materials of the primary and secondary contact zones respectively reach a predetermined minimum and maximum content; thereafter the flow of the hydrocarbon charge is reversed and the conditions of temperature and pressure initially present in the primary zone and the secondary zone are reversed and the operation is repeated in a cyclic operation to afford a continuous yield of upgraded hydrocarbon oil product. The temperature of conversion will vary depending on the type of hydrocarbons utilized and will generally range from about 400 to about 1400° F., preferably in the range from about 700 to about 1100° F. at a liquid hourly space velocity within the approximate range of 0.1 to 10. The temperature selection is also affected by the choice of other reaction conditions including contact time, and pressure. The conversion process can be carried out at various pressures from sub-atmospheric to super-atmospheric pressures but, in general, pressures within the range from about atmospheric to about 5000 pounds per square inch can be utilized. In dehydrogenation reactions it is highly desirable to utilize an inert gas, i.e. inert to the conversion, such as nitrogen, carbon dioxide, benzene or naphthalene, or the like; to aid in carrying the hydrocarbon through the molecular sieve during its conversion. The use of the inert gas will aid in maintaining uniform flow rates and provide for more uniform reaction conditions.

It is contemplated that hydrocarbon oils which contain nitrogen, sulfur and/or oxygen compounds or heavy metals may generally be treated in accordance with the instant process. Thus, petroleum crudes, gas, oils, naphthas, reduced crudes, residue, thermal and catalytic hydrocarbon stocks may be effectively treated. The present process is especially effective in selectively removing nitrogen from a hydrocarbon oil containing the same. Accordingly, high nitrogen stocks such as shale oil and tar sands are particularly applicable for treatment in accordance with the present process.

It is further contemplated that hydrocarbons which are reactive to the volatile treating agent at the preferred reaction temperatures and are converted by contact therewith to hydrocarbon products having a higher carbon-to-hydrogen ratio, can be utilized in the process of this invention. The hydrocarbons which are suitable for use in this process are those which will pass through the uniform pore openings of the molecular sieves having the volatile treating agent encased therein. It is essential, therefore, that the hydrocarbons which will be converted can pass through uniform pore openings ranging from about 4 to about 15 Angstrom units.

Molecular sieve materials utilized as contacting media in the instant process are composed of crystalline metal aluminosilicates, which have been heated to remove their water of hydration. The crystals obtained upon dehydration are unusually porous, the pores having highly uniform molecular dimensions, generally between about 4 and about 15 Angstrom units in diameter. Each crystal of molecular sieve material contains literally billions of tiny cavities or cages interconnected by channels of unvarying diameter. The size and portion of the metal ions in the crystal control the effective diameter of the interconnecting channels. As initially prepared, the metal of the aluminosilicate is an alkali metal and usually sodium. Such alkali metal is subject to base-exchange with a wide variety of other metal ions including by way of example, calcium, magnesium, silver, copper, mercury, cadmium, nickel, gold, cobalt, zinc, strontium, platinum, and the rare earth including cerium, lanthanum, neodymium, praseodymium and samarium separately or in combination. Sodium and calcium crystalline aluminosilicates of the molecular sieve type are available commercially and will ordinarily be employed for subsequent treatment with the volatile treating agent for use in the present process. It is, however, within the purview of the invention to utilize a molecular sieve material wherein the metal ion is other than a sodium or calcium ion or wherein such cation has been replaced by a hydrogen ion. The molecular sieve material may also be of the A type, X type, Y type or other well known form of molecular sieve. Preparation of these molecular sieves is well known, having been described in the literature, for example in U.S. 2,882,243 and U.S. 2,882,244. Molecular sieves available commercially and suitable for use in the present process include the 13X and 10X types which are sodium and sodium-calcium crystalline aluminosilicates, capable of adsorbing molecules whose critical diameter is less than about 10 Angstrom units and the 4A and 5A types which are sodium and sodium-calcium crystalline aluminosilicates having channel diameters which will permit adsorption of molecules smaller than about 4 and 5 Angstrom units, respectively. The combined effect of the uniformly small channel size and the strong surface forces which distinguish molecular sieves from all other adsorbents essentially isolates the compounds cages within the crystal lattice. The compound will remain confined until released by heat or by displacement with another adsorbable material.

The volatile treating agent which may be loaded into the crystalline molecular sieve material may be catalytically active material for accomplishing the desired result of upgrading the hydrocarbon oil which is normally non-gaseous at room temperatures and characterized by an appreciable vapor pressure, i.e., greater than 1 mm. at the temperature of the reaction in the primary reaction zone, namely about 400° F. to 1400° F. Specific examples of the volatile treating agent are iodine, bromium, selenium, tellurium, sulfur, Friedel-Craft type catalysts such as aluminum chloride, aluminum bromide, zinc chloride, tin chloride, ferric chloride, gallium bromide, gallium chloride, phosphorus pentoxide, phosphorus oxychloride, etc. Various methods may be employed for loading molecular sieve material with the volatile treating agent. For example the crystalline molecular sieve material may be loaded with iodine by bringing the sieve material in particle form into contact at ambient temperatures with a solution of iodine in a non-aqueous solvent such as benzene, heavy naphtha, kerosine, xylene, etc., or by contact with molten iodine or iodine vapors. When an iodine solution is employed, the resulting particles of iodine-containing molecular sieve material are removed from contact with excess solution, washed with the solvent of said solution, after which adsorbed solvent is removed by evaporation from the iodine-containing molecular sieve product. The conditions and duration of contact between the molecular sieve material and iodine is such as to encase within the crystal structure of the sieve material between about 1 and about 60 weight percent of iodine. The molecular sieve material may be intimately admixed with a powdered treating agent and the mixture heated, or vapors of the particular treating agent may be passed into the aluminosilicate to be encased therein. It is also possible to prepare these materials by treating the sieve with a vaporous compound of the treating agent which decomposes to release the treating agent either upon contact with the sieve or by a subsequent treatment, such as reduction.

Thus, a hydrocarbon oil to be upgraded and generally high in sulfur, nitrogen, oxygen and/or heavy metal content is, following the teachings of one embodiment of this invention, contacted in the presence of hydrogen with a crystalline aluminosilicate molecular sieve loaded with the volatile treating agent. Volatile treating agent containing crystalline aluminosilicate molecular sieves having an effective pore diameter of between about 4 and about 6 Angstroms have been found to be particularly effective in selectively removing nitrogen from a charge stock containing the same, while those characterized by an effective pore diameter in the approximate range of 8 to 10 Angstroms have been found to be particularly adapted to effecting selective removal of sulfur. The volatile treating agent containing molecular sieve material may be brought into contact with the oil charge in any suitable manner. The temperature of treatment should be maintained within the approximate range of 400 to 1400° F. Below about 400° F., substantially no refining action takes place, while at temperatures in excess of about 1400° F., appreciable degradation of both the hydrocarbon stock and the molecular sieve takes place resulting in a lower liquid recovery and higher gas makes with little additional refining. The pressure in the present hydroprocessing operation may vary widely depending upon the particular oil stock undergoing treatment and the temperature used but, in general, will be within the range of about 50 to about 5000 p.s.i.g. The hydrogen charge rate is generally within the approximate range of 2 to 80 moles per mole of hydrocarbon. The liquid hourly space velocity employed is ordinarily between about 0.1 and about 10.

During passage of the petroleum stock along with hydrogen oven the volatile treating agent containing molecular sieve material, a portion of the volatile treating agent is displaced and reacts catalytically with the charge stock. The amount of volatile treating agent required for refining of the oil charge depends largely on the extent of contamination. Such amount is generally between about 0.2 and about 15 percent by weight and more generally between about 1 and about 10 percent by weight of the oil undergoing treatment. The process of this invention can be carried out in any equipment suitable for catalytic operations. Accordingly, the instant hydroprocessing process is adapted to operations using a fixed bed of the volatile treating agent containing molecular sieve contacting material. Also, the process can be operated using a moving bed of particle form volatile treating agent containing molecular sieve material wherein the flow of hydrocarbon oil charge and hydrogen may be concurrent or countercurrent to the flow of contact material. A fluid type of operation wherein the volatile treating agent containing molecular sieve contact material is carried in suspension in the hydrocarbon charge may also feasibly be employed. In carrying out the process in a continuous manner, a cyclic operation is employed wherein the volatile treating agent utilized in refining the hydrocarbon charge and displaced from the volatile treating agent containing molecular sieve material is adsorbed downstream in a second bed of molecular sieve material which may either be the same or a different type molecular sieve material than that initially utilized for loading with the volatile treating agent. The second bed of molecular sieve material, maintained at a temperature between about 50 and about 300° F. and a pressure between about 50 and about 5000 p.s.i.g., originally contains no volatile treating agent. However, as the operation proceeds, the volatile treating agent content of the initial bed of the volatile treating agent containing sieve material decreases and the volatile treating agent content of the second bed of molecular sieve material, which serves as a collector of the volatile treating agent contained in the effluent, in the reactor stream, increases. As the volatile treating agent content of the second bed goes up and that of the initial bed goes down, a predetermined optimum point is reached, at which point the flow of hydrocarbon charge, together with hydrogen and the conditions of temperature and pressure present in the initial bed and second bed are reversed. The operation is thereafter repeatedly carried out on a continuous cyclic basis with a resulting high yield of upgraded oil.

When processing an oxygen-containing charge stock with iodine as the volatile treating agent, the oxygen removed, in the form of water, tends to absorb on the collector sieve, when the latter is at a temperature below the boiling point of water, along with iodine and hydrogen iodide. As the water content of the collector sieve builds up, a point is reached where water will undesirably begin to displace iodine from the sieve. To counteract such effect, intermittent drying of the sieve by exposing the same to an elevated temperature, for example about 300° F. in flowing stream of nitrogen or hydrogen has been found to be highly desirable when treating stocks high in oxygen content. Such step is feasibly carried out before reversing the flow of charge stock and hydrogen in the above-described cyclic operation.

In the dehydrogenation reactions, utilizes iodine, for example, as the volatile treating agent during the passage of the hydrocarbon through the iodine containing molecular sieve material, a portion of the iodine is displaced and a portion thereof reacts catalytically with the charge stock to form predominately hydrogen iodide. The effluent compound of the hydrocarbon product, iodine and hydrogen iodide are then passed on to a second bed of molecular sieve material, being initially substantially free of elemental iodine, which can selectively collect the iodine and hydrogen iodide and permit the hydrocarbon product to pass through the sieve. This second bed of molecular sieve material is maintained at temperatures in the range from about 50° F. to about 300° F. and at pressures ranging from sub-atmospheric to super-atmospheric pressure, preferably from about atmospheric to about 5000 pounds per square inch. As the operation proceeds, the elemental iodine content of the initial bed of the iodine-containing sieve material decreases and the iodine content, predominately hydrogen iodide, of the second bed of molecular sieve material which serves as a collector of iodine-containing effluent in the reactor stream, increases. As the iodine content of the second bed goes up and that of the initial bed goes down, a predetermined optimum point, i.e., no greater than 60 weight percent iodine, is reached, at which point the flow of the hydrocarbon charge is reversed as well as the operating conditions of each bed to yield a cyclic process with a high yield of the desired hydrocarbon product. When the amount of hydrogen iodide collected on the beds increases to a point where the dehydrogenation reaction is reduced, the molecular sieve must be regenerated to convert the hydrogen iodide to the elemental iodine.

Various methods of regeneration hydrogen iodide to elemental iodine are known in the art. These methods include, among others, the oxidation of hydrogen iodide to elemental iodine and water; the use of chlorine to convert the hydrogen iodide to hydrogen chloride and elemental iodine; photochemical regeneration of hydrogen iodide to elemental iodine; and the like. These known methods can be used to regenerate the iodine products in the molecular sieves of the instant process to elemental iodine.

Figures 1, 2:
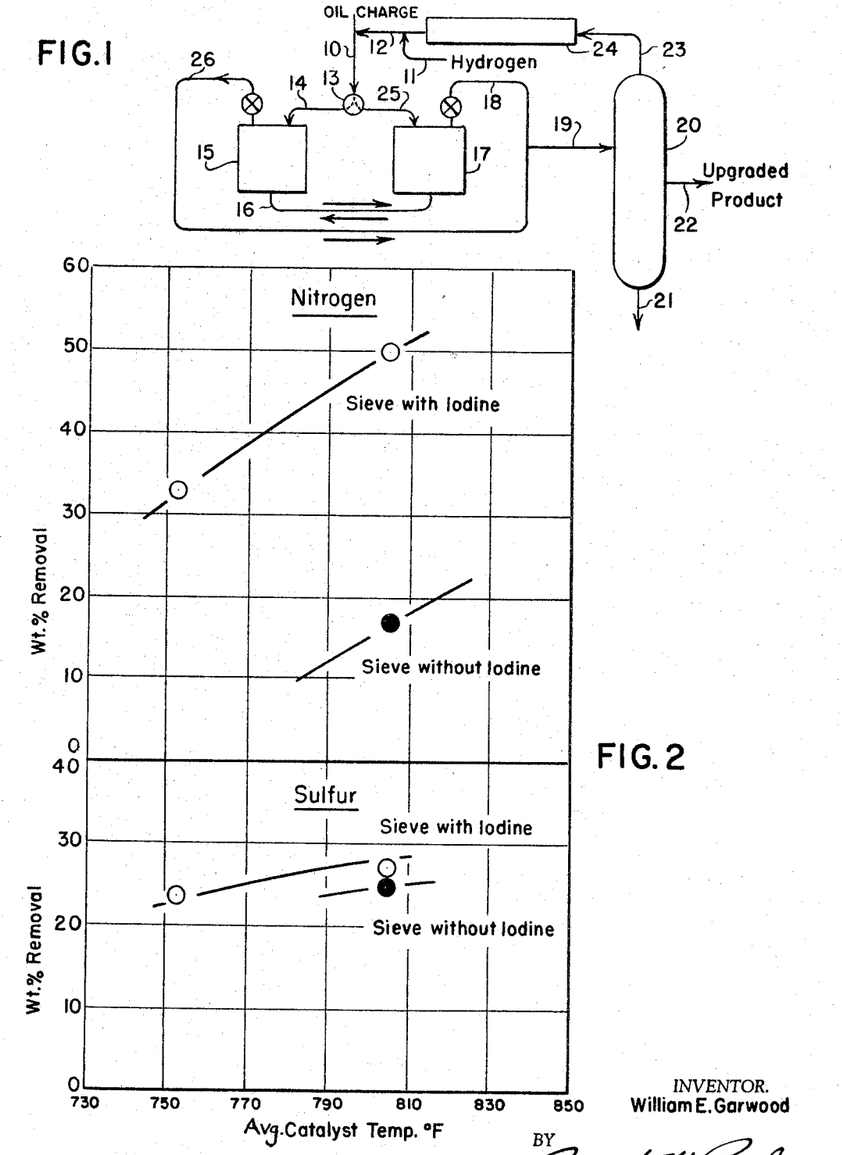

A system for carrying out the above-described continuous cyclic operation utilizing hydrogen as the gaseous medium is shown in FIG. 1 of the attached drawing. Referring more particularly to such figure, a charge of hydrocarbon oil to be upgraded is introduced through conduit 10. Hydrogen is introduced through conduits 11 and 12 and flows in admixture with the oil charge through a multi-bypass valve 13 controlled to direct the entire flow through conduit 14 to reaction chamber 15 having contained therein a crystalline molecular sieve material loaded with a suitable quantity of volatile treating agent and maintained by means not shown at a temperature between about 400 and about 1400° F. and a pressure between about 50 and about 5000 p.s.i.g. The effluent from reactor 15 flows through conduit 16 to vessel 17 containing a crystalline molecular sieve material initially free of volatile treating agent and maintained, by means not shown, at a temperature between about 50° F. and about 300° F. and a pressure between about 50 and about 5000 p.s.i.g. Volatile treating agent contained in the effluent stream entering vessel 17 is adsorbed on the molecular sieve material contained therein. The remaining product stream flows from vessel 17 through conduit 18 and is conducted through line 19 to fractionator 20. Residual product is removed from the bottom of thee fractionator through outlet 21. The upgraded oil product is removed through outlet 22. A hydrogen containing stream is removed overhead through outlet 23 and passes through absorber 24 wherein ammonia and/or hydrogen sulfide are removed by adsorption. Residual hydrogen passes from absorber 24 through line 12 and is recycled to the operation.

When the amount of the volatile treating agent contained in the molecular sieve material in vessel 15 and the amount of volatile treating agent contained in the molecular sieve material in vessel 17 respectively reach a predetermined minimum and maximum content, bypass valve 13 is adjusted to direct the entire flow through conduit 25 to vessel 17. The effluent from 17 then flows through conduit 16 to vessel 15 and passes therefrom through conduit 26 and then through line 19 to fractionator 20 as described above. The above cyclic operation may be repeated any desired number of times, with control of valve 13 being placed, if desired, on an automatic basis. Such manner of operation provides an inexpensive and unusually efficient means for recovering the volatile treating agent and affording a resultant high yield of upgraded oil product.

The following examples will serve to illustrate the process of the invention without limiting the same.

Example 1

Iodine-loaded 5A sieve was prepared by contacting 110 grams of commercially available 5A sieve in the form of $\frac{1}{16}'' \times \frac{1}{8}''$ pellets with 40 grams of iodine dissolved in 300 cc. (264 grams) of thiophene-free benzene. The color of the solution changed from very dark red to pale red upon standing overnight. The iodine solution and sieve pellets were permitted to remain in contact and equilibrate for a period of 12 days, after which supernatant liquid was decanted. The sieve was then washed 4 times with 100 cc. batches of benzene and the absorbed benzene was removed by evaporation at atmospheric conditions. As the benzene evaporated, the iodine-sieve product changed color from black to brown and reached a constant weight of 153 grams. The iodine content of the product by analysis was 25.8 weight percent.

Example 2

Thermal stability of the iodine-loaded 5A sieve was determined by charging 10 cc. (9.8 grams) thereof to a stainless steel reactor, passing nitrogen thereover at the rate of 50 cc./min. and bubbling the effluent gas through xylene. Coloration of successive 50 cc. portions of the xylene was used as an indication of the evolution of iodine from the sieve under the following conditions.

| Temp., ° F. | Time, mins. | Color of Xylene Solution |
|---|---|---|
| 262–269 | 30 | Colorless. |
| 350–370 | 60 | Dark brown. |
| 360 | 30 | Light brown. |
| 360 | 30 | Very pale brown. |
| 750 | 30 | Dark brown. |
| 750 | 30 | Very light brown. |

The very light brown color of the xylene solution after treatment at the last 30 minutes at 750° F. was taken as indication that little, if any, additional iodine would be evolved with further time. Residual iodine of resulting product, upon analysis, was 2.4 weight per cent.

Example 3

This example will serve to illustrate catalytic hydroprocessing of a gas oil charge stock utilizing as catalyst the iodine-loaded 5A sieve prepared as described in Example 1.

The charge stock employed was a Mid-Continent heavy gas oil having the following properties:

| | |
|---|---|
| Gravity, specific | 0.8967 |
| Gravity, ° API | 26.3 |
| Vacuum assay, ° F.: | |
| I.B.P. | 574 |
| 5% | 658 |
| 10% | 669 |
| 20% | 693 |
| 30% | 716 |
| 40% | 740 |
| 50% | 767 |
| 60% | 800 |
| 70% | 834 |
| 80% | 873 |
| 90% | 922 |
| 95% | 944 |
| Nitrogen, wt. percent | 0.06 |
| Sulfur, wt. percent | 0.59 |
| Oxygen, wt. percent | 0.62 |
| Hydrogen, wt. percent | 12.60 |
| Aniline No., ° F. | 189.3 |
| Pour point, ° F. | +85 |

Hydroprocessing conditions included a pressure of 2000 p.s.i.g., a liquid hourly space velocity of 0.5, a hydrogen to oil mole ratio of 9.5 (corresponding to 3000 s.c.f./bbl.) and a time on stream of 6 hours, with material balance at 2–6 hours.

Results at an average catalyst temperature of 752° F. are hereinafter set forth in Table I. Liquid recovery was 98 volume percent, nitrogen removal was 33 weight percent, sulfur removal was 24 weight percent and oxygen removal 26 weight percent. Less than 0.01 weight percent iodine was found in the total liquid product. The conversion (100%–650° F.+) was 20 volume percent.

For the purpose of absorbing iodine-containing effluent (as iodine and hydrogen iodide) as it was liberated from the iodine-loaded 5A sieve, an equal volume, i.e. 50 cc. of commercially available 4A sieve was placed in the reactor 9 inches downstream from the iodine–5A sieve separated from it by a stainless steel spacer (the 9 inches without the spaces would hold 86 cc. of catalyst). No outside heat was applied to the 4A collector sieve, so that the temperature gradient ranged from that of the hot product oil at the top of the reactor to a lower temperature at the bottom.

The top of the 4A collector sieve bed, upon removal, was found to be pale yellow, becoming progressively darker to red and finally black near the bottom, indicating an increasing iodine content attributable to the temperature gradient. The presence of iodine was confirmed by addition of $AgNO_3$ to several pellets in water. Yellow AgI immediately formed. The 49.8 grams of the collector sieve contained 17 weight percent hydrocarbon and, by weight difference, 10 weight percent iodine. The 48.4 grams of used iodine-loaded 5A sieve from the top of the reactor contained 6 weight percent hydrocarbon and, by weight difference, 16 weight percent iodine. The iodine balance was thus as follows:

| | Grams |
|---|---|
| Charged in fresh iodine-loaded 5A sieve | 13.1 |
| Remaining in used iodine-loaded 5A sieve | 7.7 |
| Absorbed by 4A collector sieve | 5.0 |

Recovery of iodine utilizing the collector sieve bed was accordingly 97 weight percent.

Example 4

Hydroprocessing was carried out utilizing the charge stock, catalyst and conditions of Example 3, with the exception that the average catalyst temperature was 804° F. The results obtained are hereinafter set forth in Table I. Liquid recovery was 97.8 volume percent, nitrogen removal was 50 weight percent, sulfur removal was 27 weight percent, oxygen removal was 40 weight percent and conversion (100%–650° F.+) was 34 volume percent.

Fresh 4A sieve (49 cc.) was placed downstream of the iodine-5A sieve in the same manner as in Example 3. The hydrocarbon content of the 47.8 grams of the 4A collector sieve was 17 weight percent and the iodine content, by weight difference, was 12 weight percent. The 46.9 grams of used iodine-loaded 5A sieve from the top of the reactor contained 2 weight percent hydrocarbon and 17 weight percent iodine. The iodine balance was thus as follows:

|  | Grams |
|---|---|
| Charged in fresh iodine-loaded 5A sieve | 13.3 |
| Remaining in used iodine-loaded 5A sieve | 7.9 |
| Absorbed by 4A collector sieve | 5.7 |

Recovery of iodine was accordingly 100 weight percent.

Example 5

Hydroprocessing of the charge stock described in Example 3 was carried out utilizing as catalyst a 5A sieve which contained no iodine. The conditions of hydroprocessing were those employed in Example 3 except that the average catalyst temperature was 805° F. Liquid recovery was 96.2 volume percent, nitrogen removal was 17 weight percent, sulfur removal was 25 weight percent, oxygen removal was 50 weight percent and conversion (100%–650° F.+) was 33 volume percent. The results obtained, together with those of Examples 3 and 4 are set forth in Table I below:

TABLE I

|  | Example | | |
|---|---|---|---|
|  | 3 | 4 | 5 |
|  | Catalyst | | |
|  | Iodine Loaded 5A Sieve | Iodine Loaded 5A Sieve | 5A Sieve |
| Cc. | 50 | 50 | 50 |
| Grams | 50.8 | 51.6 | 35.5 |
| Avg. Cat. Temp., 2–6 Hours | 752 | 804 | 805 |
| Total Liq. Product: | | | |
| Recovery, Vol. percent | 98.4 | 97.8 | 96.2 |
| Gravity, ° API | 31.0 | 31.9 | 30.6 |
| Nitrogen, Wt. percent | 0.04 | 0.03 | 0.05 |
| Percent Removal | 33 | 50 | 17 |
| Sulfur, Wt. percent | 0.45 | 0.43 | 0.44 |
| Percent Removal | 24 | 27 | 25 |
| Oxygen, Wt. percent | 0.46 | 0.37 | 0.31 |
| Percent Removal | 26 | 40 | 50 |
| Hydrogen, Wt. percent | 12.75 | 12.79 | 12.64 |
| Iodine, Wt. percent | <0.01 | <0.01 |  |
| Material Bal. Data: | | | |
| Conv., Vol. percent (100%–390° F.+) | 3.9 | 11.0 | 11.2 |
| Conv., Vol. percent (100%–650° F.+) | 20.5 | 33.8 | 33.1 |
| Yields: | | | |
| Dry Gas, Wt. percent | 0.30 | 0.46 | 0.64 |
| $C_4$'s, Vol. percent | 0.8 | 1.0 | 1.3 |
| $C_5$'s, Vol. percent | 0.7 | 0.9 | 2.6 |
| $C_6$–170° F., Vol. percent | <0.1 | <0.1 | 1.6 |
| 170–390° F., Vol. percent | 4.8 | 12.0 | 7.5 |
| 390–650° F., Vol. percent | 16.6 | 22.8 | 21.9 |
| 650° F.+, Vol. percent | 79.5 | 66.2 | 66.9 |
| $H_2$ Consumption, s.c.f./bbl | 85 | 135 | 35 |

The extent of nitrogen and sulfur removal achieved in the foregoing examples is shown graphically in FIGURE 2 wherein the weight percent of nitrogen and sulfur removed is plotted against the average catalyst temperature. It will be evident from the data of Table I and particularly from FIGURE 2 that the iodine-loaded sieve catalyst exhibits an unexpected selectivity for nitrogen removal to a marked extent and for sulfur removal to a lesser extent over the sieve which did not contain iodine.

Figure 3:
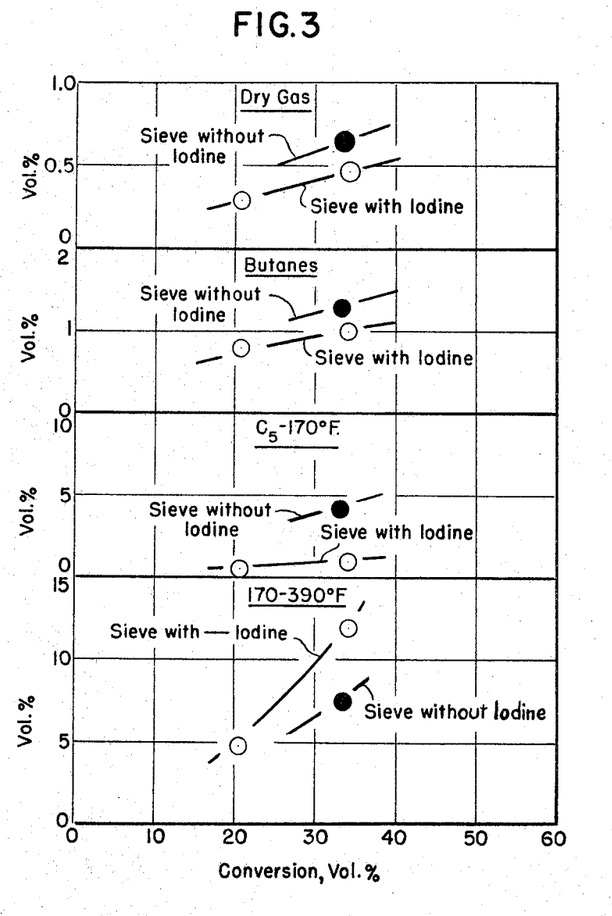

The improved selectivity of the iodine-loaded 5A sieve over the 5A sieve alone is further evident from a consideration of FIGURE 3. It will be seen by reference to such figure that at the same conversion, the iodine-loaded 5A sieve produces less dry gas, less butanes, less $C_5$–170° F. light naphtha and more 170–390° F. heavy naphtha, as compared to the 5A sieve which did not contain iodine.

Example 6

Iodine-loaded 10X sieve was prepared by contacting 85 grams of commercially available 10X sieve in the form of 1/16" x 1/8" pellets with 35 grams of iodine in a closed glass-lined bomb at 400° F. for 2 hours. The bomb was then cooled to room temperature and opened. All of the iodine appeared to have been taken up by the sieve and, upon analysis, the iodine content was found to be 25.4 weight percent.

A petroleum charge stock was subjected to catalytic hydroprocessing utilizing 50 cc. of the above-described iodine-loaded 10X sieve. The charge stock was characterized by the following properties:

| | |
|---|---|
| Gravity, ° API | 24.5 |
| Distillation, ASTM: | |
| I.B.P. | 418 |
| 5% | 467 |
| 10% | 484 |
| 20% | 508 |
| 30% | 532 |
| 40% | 558 |
| 50% | 588 |
| 60% | 615 |
| 70% | 653 |
| 80% | 688 |
| 90% | 725 |
| E.P. | 744 |
| Nitrogen, wt. percent | 0.23 |
| Sulfur, wt. percent | 0.97 |
| Oxygen, wt. percent | 0.95 |
| Hydrogen, wt. percent | 11.93 |
| Aniline No., ° F. | 127.9 |
| Pour point, ° F. | +20 |

Hydroprocessing conditions included a pressure of 2000 p.s.i.g., a liquid hourly space velocity of 1, a hydrogen charge rate of 1500 s.c.f./bbl., a temperature of 800° F. and a time of 6 hours, with material balance at 2–6 hours.

An equal volume, i.e. 50 cc., of commercially available 10X sieve was placed downstream from the iodine-10X sieve and served as a collector sieve in a manner described in pevious examples.

The results obtained are hereinafter set forth in Table II. It will be noted that as a result of the described treatment, nitrogen removal was 68 weight percent, sulfur removal was 46 weight percent and oxygen removal was 70 weight percent.

Example 7

Hydroprocessing was carried out utilizing the charge stock, catalyst and conditions of Example 6, with the exception that the reaction temperature was 849° F. The results obtained are hereinafter set forth in Table II. In this instance, nitrogen removal was 74 weight percent, sulfur removal was 59 weight percent and oxygen removal was 72 weight percent.

Fresh 10X was placed downstream of the iodine-10X sieve in the same manner as in Example 6. The total analysis of the 40.6 grams of used iodine-10X sieve and 51.2 grams of 10X collector sieve was as follows:

|  | Used Iodine 10X | Used 10X Collector |
|---|---|---|
| Wt. Percent Carbon | 2.4 | 14.0 |
| Wt. Percent Hydrogen | 0.5 | 3.1 |
| Wt. Percent Sulfur | 0.10 | 0.17 |
| Wt. Percent Nitrogen | 0.14 | 0.65 |
| Wt. Percent Oxygen |  | 3.5 |
| Wt. Percent Iodine | 6.9 | 15.8 |

The iodine balance was as follows:

Grams
Charge in fresh iodine-loaded 10X sieve _________ 12.4
Remaining in used iodine-loaded 10X sieve ______ 2.8
Adsorbed by 10X collector sieve ______________ 8.1

Recovery of iodine was accordingly 88 weight percent.

*Example 8*

Hydroprocessing of the charge stock described in Example 7 was carried out under the conditions described in such example but utilizing as catalyst a 10X sieve which contained no iodine. In this instance, nitrogen removal was found to be 52 weight percent, sulfur removal was 29 weight percent and oxygen removal was 59 weight percent. The results obtained, together with those of Examples 6 and 7 are set forth in Table II below:

TABLE II

|  | Example 6 | Example 7 | Example 8 |
|---|---|---|---|
| Catalyst (50 cc.) | I$_2$-10X | I$_2$-10X | 10X |
| Grams | 48.9 | 48.9 | 33.0 |
| Collector Sieve (50 cc.) | 10X | 10X | 10X |
| Grams | 33.1 | 32.1 | 33.0 |
| Operating Conditions: |  |  |  |
| On-Stream Period,[a] hrs | 2-6 | 2-6 | 2-6 |
| Pressure, p.s.i.g | 2,000 | 2,000 | 2,000 |
| LHSV | 1 | 1 | 1 |
| Temp., °F | 800 | 849 | 849 |
| H$_2$ Circulation, s.c.f./bbl | 1,500 | 1,500 | 1,500 |
| Total Liq. Product: |  |  |  |
| Recovery, Vol. Percent | 101.7 | 103.0 | 101.4 |
| Gravity, °API | 29.6 | 32.0 | 28.9 |
| Nitrogen, Wt. percent: |  |  |  |
| Charge | 0.23 | 0.23 | 0.23 |
| Product | 0.073 | 0.060 | 0.11 |
| Percent Removal | 68 | 74 | 52 |
| Sulfur, Wt. Percent: |  |  |  |
| Chg | 0.97 | 0.97 | 0.97 |
| Product | 0.52 | 0.40 | 0.69 |
| Percent Removal | 46 | 59 | 29 |
| Oxygen, Wt. Percent: |  |  |  |
| Chg | 0.95 | 0.95 | 0.95 |
| Product | 0.29 | 0.27 | 0.39 |
| Percent Removal | 70 | 72 | 59 |
| Hydrogen, Wt. Percent: |  |  |  |
| Chg | 11.93 | 11.93 | 11.93 |
| Product | 12.11 | 11.34 | 12.12 |
| Material Balance Data: |  |  |  |
| Conv., Vol. Percent (100%-390° F.+) | 11.4 | 19.4 | 12.4 |
| Yields: |  |  |  |
| Dry Gas, Wt. Percent | 1.7 | 1.4 | 0.4 |
| C$_4$'s, Vol. Percent | 2.4 | 3.1 | 1.5 |
| C$_5$'s, Vol. Percent | 1.8 | 2.8 | 1.4 |
| C$_6$-170° F., vol.Percent | 1.0 | 3.2 | 1.8 |
| 170-390° F., vol. percent | 7.9 | 13.3 | 9.1 |
| 390° F.+, Vol. Percent | 88.6 | 80.6 | 87.6 |
| H$_2$ Cons., s.c.f./bbl | 250 | 225 | 155 |
| 390° F.+ Gravity, °API | 26.8 | 26.4 | 26.1 |
| Aniline No | 131.6 | 127.3 | 129.2 |
| Diesel Index | 35.3 | 33.6 | 33.7 |
| Charge, Diesel Index | 31.4 | 31.4 | 31.4 |

[a] 1 hour hydrogen purge at end of 6 hours before pressure letdown and heats off.

It will be seen from the foregoing data and particularly from a comparison of Examples 6 and 7 wherein a catalyst of iodine-containing 10X sieve was employed as catalyst that the higher temperature of reaction favored removal of nitrogen and sulfur and to a lesser extent oxygen. It will further be noted that use of the 10X sieve without iodine, even at the higher temperature, proved to be much less active for removal of all three heteroatoms, i.e. nitrogen, sulfur and oxygen and also for conversion to products boiling below 390° F. (12.4 volume percent for Example 8 compared to 19.4 volume percent for Example 7).

*Example 9*

Iodine-loaded 13X sieve was prepared by contacting 85 grams of commercially available 13X sieve in the form of 1/16" x 1/8" pellets with 35 grams of iodine in a closed glass-lined bomb at 400° F. for 2 hours. The bomb was then cooled to room temperature and opened. The iodine content of the loaded sieve was found to be 24.7 weight percent.

A coker gas oil was subjected to catalytic hydroprocessing utilizing 50 cc. of the above iodine-loaded 13X sieve. The charge stock was characterized by the following properties:

Gravity, °API _______________________ 23.2

Distillation, ASTM:
I.B.P. ___________________________ 338
5% _____________________________ 414
10% ____________________________ 434
20% ____________________________ 463
30% ____________________________ 488
40% ____________________________ 513
50% ____________________________ 544
60% ____________________________ 557
70% ____________________________ 605
80% ____________________________ 636
90% ____________________________ 670
EP _____________________________ 705
Nitrogen, wt. percent _______________ 0.46
Sulfur, wt. percent _________________ 1.24
Oxygen, wt. percent ________________ 0.52
Hydrogen, wt. percent _______________ 11.31
Aniline No., °F. ____________________ 101.2
Pour point, °F. ____________________ +15

Hydroprocessing conditions included a pressure of 500 p.s.i.g., a liquid hourly space velocity of 1, a hydrogen charge rate of 1500 s.c.f./bbl., a temperature of 848° F. and an on-stream time of 6 hours, with material balance at 2-6 hours. An equal volume, i.e. 50 cc. of commercially available 13X sieve was placed downstream from the iodine-13X sieve and served as a collector sieve in a manner described in previous examples.

The results obtained are hereinafter set forth in Table III. It will be noted that as a result of the described treatment, nitrogen removal was 37 weight percent, sulfur removal was 36 weight percent, and oxygen removal was 54 weight percent.

*Example 10*

Hydroprocessing of the charge stock described in Example 9 was carried out under the conditions described in such example but utilizing as catalyst a 13X sieve which contained no iodine. Under such conditions, sulfur removal was found to be only 6 weight percent and oxygen removal 46 weight percent. The results obtained together with those of Example 9 are set forth in Table III below:

TABLE III

| | Example | |
|---|---|---|
| | 9 | 10 |
| Catalyst (50 cc.) | I₂–13X | 13X |
| Grams | 45.0 | 32.0 |
| Collector Sieve (50 cc.) | 13X | 13X |
| Grams | 32.0 | 32.0 |
| Operating Conditions: | | |
| On-Stream Period,ᵃ hrs | 2–6 | 2–6 |
| Pressure, p.s.i.g | 500 | 500 |
| LHSV | 1 | 1 |
| Temp., °F | 848 | 848 |
| H₂ Circulation, s.c.f./bbl | 1,500 | 1,500 |
| Total Liq. Product: | | |
| Recovery, Vol. Percent | 99.9 | 99.3 |
| Gravity, °API | 26.1 | 25.5 |
| Nitrogen, Wt. Percent: | | |
| Chg | 0.46 | 0.46 |
| Product | 0.29 | 0.27 |
| Percent Removal | 37 | 41 |
| Sulfur, Wt. Percent: | | |
| Chg | 1.24 | 1.24 |
| Product | 0.80 | 1.16 |
| Percent Removal | 36 | 6 |
| Oxygen, Wt. Percent: | | |
| Chg | 0.52 | 0.52 |
| Product | 0.24 | 0.29 |
| Percent Removal | 54 | 46 |
| Hydrogen, Wt. Percent: | | |
| Chg | 11.92 | 11.92 |
| Product | 11.16 | 11.16 |
| Material Balance Data: | | |
| Conv., Vol. Percent (100%–390° F.+) | 19.3 | 14.3 |
| Yields: | | |
| Dry Gas, Wt. Percent | 1.7 | 1.2 |
| C₄'s, Vol. Percent | 1.2 | 0.8 |
| C₅'s, Vol. Percent | 1.0 | 0.5 |
| C₆–170° F., Vol. Percent | 2.1 | 0.4 |
| 170–390° F., Vol. Percent | 13.6 | 11.0 |
| 390° F.+, Vol. Percent | 80.7 | 85.7 |
| H₂ Cons., s.c.f./bbl | 20 | –30 |
| 390° F.+ Gravity, °API | 21.9 | 22.6 |
| Aniline No | 102.5 | 100.1 |
| Diesel Index | 22.4 | 22.6 |
| Charge, Diesel Index | 23.5 | 23.5 |

ᵃ 1 hour hydrogen purge at end of 6 hours before pressure letdown and heats off.

It will be seen from the above comparative data that the extent of sulfur and oxygen removal utilizing the iodine-loaded 13X sieve as catalyst was much greater than that obtained with the 13X sieve containing no iodine. It will also be evident that conversion to products boiling below 390° F. was substantially greater with the iodine-loaded 13X sieve.

From the foregoing description it will be seen that iodine-loaded molecular sieve materials generally are advantageous for hydroprocessing petroleum stocks. Thus, liquid yield of upgraded oil product is high compared to previously proposed processes in which elemental iodine alone was used, nitrogen, sulfur and oxygen are effectively removed and cracking selectivity is improved as compared with use of the molecular sieve material in the absence of contained iodine.

*Example 11*

A mixture of vaporous ethane and nitrogen gas is passed through a molecular sieve containing elemental bromine at 1100° F. The effluent contains predominately bromine, hydrogen bromide and the predominant hydrocarbon product ethylene which is passed into a collector 5A molecular sieve being initially free of bromine. After adsorption of the bromine product on the 5A collector molecular sieve at ambient temperatures has progressed to the desired point, the hydrocarbon flow is then reversed and the original molecular sieve becomes the collector sieve. After several such reversals, the hydrocarbon flow is stopped and the collector sieves are then regenerated by passing chlorine through the molecular sieves at room temperature causing the molecular sieves to take on the characteristic orange bromine color. After this color change is complete, a stream of hydrogen is passed through the bromine containing molecular sieves at temperatures in the range from about 150–500° F. to convert any bromine compounds which may have formed to elemental bromine. The collector molecular sieves are now available to convert a further stream of ethane to ethylene.

*Example 12*

A 1.5 ml. sample of 13X molecular sieve is mixed with 1 cc. selenium powder in a test tube. The tube is heated to permit interdispersion and eliminate excess selenium by sublimation. The finished catalyst contains 8.1% selenium. The catalyst is purged in a helium flow at 700–800° F. and 900° F. for one hour each and at 1000° F. for five hours (until constant weight is obtained). The catalyst is then utilized for hexane conversion at 1000° F. A second 13X molecular sieve without selenium is utilized in series with the initial selenium containing molecular sieve to collect the effluent catalyst. The flow may be reversed when desired an accordance with the present invention.

*Example 13*

Iodine-loaded 13X sieve is prepared by containing 85 grams of commercially available 13X sieve in the form of 1/16 x 1/8" pellets with 35 grams of iodine in a closed glass-lined bomb at 400° F. for 2 hours. The bomb is then cooled to room temperature and opened. The iodine content of the loaded sieve is found to be 24.7 weight percent.

Normal hexadecane is passed over this catalyst under the conditions of 0.5 liquid hourly space velocity, nitrogen atmosphere with a nitrogen flow rate of 300 s.c.f./bbl. and a pressure of 50 pounds per square inch gauge in a glass reactor. The average catalyst temperature during the 2 to 6 hour period is 868° F. Dehydrocyclization is indicated in this reaction by the low hydrogen content (14.06 weight percent) and yields (75.5 volume percent) of liquid product. The aromatic content of the liquid product by analysis is 21 volume percent. A complete material balance of the liquid product fractionated with yields expressed as weight percent of normal hexadecane charge is indicated as follows:

| | |
|---|---|
| H₂ (in gas) | 0.4 |
| C₁–C₃ | ᵃ 3.2 |
| C₄ | ᵇ 7.2 |
| C₅ | ᶜ 5.5 |
| C₆–170° F. | 4.2 |
| 170–390° F. | 17.5 |
| 390° F.+ | 52.8 |
| Hydrocarbon adsorbed on sieve and loss | 9.2 |
| Total | 100.0 |

ᵃ 0.5% methane, 0.4% ethane, 0.4% ethylene, 1.4% propane, 0.5% propene.
ᵇ 3.6% i-butane, 2.5% butenes, 1.1% n-butane.
ᶜ 3.5% i-pentane, 0.5% pentenes, 0.6% n-pentene, 0.5% cyclopentane.

Compositions of the C₆–170° F. and 170–390° F. fractions by mass spectrometer analysis are as follows:

| | C₆–170° F. Fraction | 170–390° F. Fraction |
|---|---|---|
| Paraffins, weight percent | 46.2 | ᵃ 20.1 |
| Monocyclic naphthenes | } 48.4 | { 2.3 |
| Mono-olefins | | 19.0 |
| Di-olefins and cycloolefins | | 0.7 |
| Monocyclic aromatics | 5.4 | ᵇ 56.2 |
| Indanes and tetralins | | 1.7 |
| Naphthalenes | | 0.1 |

ᵃ 0.5% C₅, 2.0% C₆, 7.0% C₇, 4.4% C₈, 2.9% C₉, 2.2% C₁₀, 1.0% C₁₁ and 0.1% C₁₂.
ᵇ 37.1% benzene, 3.3% toluene, 5.6% C₈, 6.8% C₉, 2.5% C₁₀, 0.7% C₁₁ and 0.1% C₁₂ alkyl benzenes.

Total aromatics amount to about 1 mole for every 4 moles of n-hexadecane charged. The product distributions and compositions, primarily that of the 170–390° F. fraction, indicate the course of the reaction. Mono-olefins build up, then react further and reappear as aromatics without any appreciable accumulation of the intermediate naphthenes, di-olefins or cyclo-olefins.

For the purpose of adsorbing iodine (as hydrogen iodide and also any elemental iodine or other iodine product) from the product stream, 47 cubic centimeters (28.2 grams) of commercial 13X molecular sieve is placed in the reactor 9 inches downstream from the 50 cubic centimeters of iodine-13X molecular sieve, separated from it by a stainless steel spacer (the 9 inches without the spacer would hold 86 cubic centimeters of catalyst). No outside heat is applied to the fresh collector sieve, so that the temperature gradient ranges from that of the hot product at the top to a lower temperature at the bottom with an average temperature not exceeding 300° F.

The 41.0 grams of used collector sieve contains 15.5 weight percent hydrocarbon by analysis and by difference 15.7 weight percent iodine (as hydrogen iodide and/or elemental iodine). The 37.2 grams of used iodine-loaded 13X sieve from the top of the reactor contins 6.0 weight percent hydrocarbon by analysis and by difference 7.0 weight percent iodine. The iodine balance is as follows:

| | Grams |
|---|---|
| Charged on fresh iodine-loaded 13X sieve | 10.7 |
| Left on iodine-loaded 13X sieve | 2.6 |
| Adsorbed by 13X collector sieve | 6.5 |

Recovery of the iodine is thus 85 percent.

After the deposited iodine product in the 13X collector molecular sieve at ambient temperatures is completed, the hydrocarbon flow is then stopped and the collector sieve is regenerated by passing chlorine through the molecular sieve at room temperature causing the molecular sieve to take on the characteristic brown iodine color. After this color change is complete, a stream of hydrogen is passed through the iodine containing molecular sieve at temperatures in the range from about 150–400° F. to convert any iodine chlorides which may have formed to elemental iodine. The collector molecular sieve is now available to convert a further stream of n-hexadecane to desirable hydrocarbon products using the first molecular sieve originally containing the elemental iodine as the collector sieve.

In a similar manner above, after collection of the iodine product in the 13X molecular sieve at ambient temperatures is completed, the hydrocarbon flow is then stopped and the collector sieve is regenerated by irradiating it with utra-violet light having a wave length in the range from about 2000 to about 3800 Angstroms, until the molecular sieve material takes on the characteristic brown iodine color. This collector sieve is now available to convert the iodine-reactive hydrocarbons to the desired products. The regeneration need not be accomplished after each contact with the catalyst, and the cyclic operation may be accomplished stopping for regeneration as necessary.

It will accordingly be understood that the above description is merely illustrative of preferred embodiments of the invention of which many variations may be made within the scope of the following claims by those skilled in the art without departing from the spirit thereof.

I claim:
1. A continuous cyclic process for hydroprocessing a hydrocarbon oil which comprises contacting the same in a primary contact zone containing a crystalline molecular sieve material having a volatile treating agent encased within its crystal structure at a temperature between about 400 and about 1400° F., said treating agent being non-gaseous at room temperature and having a vapor pressure greater than 1 mm. at the temperature used in the primary treating zone, said treating agent being capable of upgrading said hydrocarbon oil and of being released from said molecular sieve material at the temperature used in the primary treating zone, passing the effluent stream containing said released treating agent from said primary contact zone to a secondary contact zone containing a crystalline molecular sieve material initially free of said treating agent and maintained at a temperature between about 50 and 300° F. capable of adsorbing said treating agent, whereby the treating agent contained in the effluent stream from said primary zone is adsorbed on the molecular sieve material in said secondary contact zone upon passage therethrough, maintaining the aforesaid contacting conditions until the volatile treating agent contained in the molecular sieve materials of said primary and second contact zones respectively reach a predetermined minimum and maximum content, thereafter reversing the flow of the hydrocarbon oil charge and the conditions initially present in said primary zone and said secondary zone and repeating the aforesaid cyclic operation to afford a continuous yield of upgraded hydrocarbon oil product.

2. A continuous cyclic process in accordance with claim 1 wherein the molecular sieve material has uniform pore openings of between about 4 and 15 Angstroms in diameter.

3. A continuous cyclic process in accordance with claim 1 wherein the amount of volatile treating agent encased in the molecular sieve material is between about 1 and about 60 weight percent.

4. A continuous cyclic process in accordance with claim 1 wherein the reaction is a hydrogenation reaction.

5. The process of claim 1 wherein the molecular sieve material is characterized by an effective uniform pore diameter of between about 4 and about 15 Angstrom units and is a crysalline aluminosilicate of a metal selected from the group consisting of alkali metals and alkaline earth metals.

6. A continuous cyclic process in accordance with claim 1 wherein the reaction is a dehydrogenation reaction.

7. A continuous cyclic process in accordance with claim 6 wherein the hydrogenated volatile treating agent formed as a result of the dehydrogenation reaction and collected in a molecular sieve is regenerated to the volatile treating agent from time to time prior to reverting the flow.

8. A continuous cyclic process for upgrading a hydrocarbon oil which comrises contacting the same with hydrogen at a temperature between about 400 and about 1400° F. in a primary contact zone containing a crystalline molecular sieve material having iodine encased within its crystal structure, passing the effluent stream from said primary contact zone to a secondary contact zone containing a crystalline molecular sieve material initially free of iodine and maintained at a temperature between about 50 and about 300° F., whereby iodine-containing effluent in the stream from said primary zone is adsorbed on the molecular sieve material in said secondary contact zone upon passage therethrough, maintaining the aforesaid contacting conditions until the iodine contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

9. A continuous cyclic process for removing nitrogen, sulfur and oxygen from a hydrocarbon oil containing the same which comprises contacting said oil with hydrogen at a temperature between 400 and about 1400° F. in a primary contact zone containing a crystalline molecular sieve material having uniform pore openings of between about 4 and about 15 Angstroms in diameter and having encased within its crystalline structure between about 1 and about 60 weight percent of iodine, passing the effluent stream from said primary contact zone to a secondary contact zone containing a crystalline molecular sieve material having uniform pore openings of between about 4 and about 15 Angstroms in diameter initially free of iodine and maintained at a temperature between about 50 and about 300° F., whereby iodine-containing effluent in the stream from said primary zone is adsorbed on the molecular sieve material in said secondary contact zone upon passage therethrough, maintaining the aforesaid contacting conditions until the iodine contained in the molecular sieve materials of said primary and secondary contact zones respectively reach a predetermined minimum and maximum content, thereafter reversing the flow of the hydrocarbon oil charge and hydrogen and the conditions of temperature initially present in said primary zone and said secondary zone and repeating the aforesaid cyclic operation to afford a continuous yield of upgraded hydrocarbon oil product.

10. A continuous cyclic process for selectively removing nitrogen from a hydrocarbon oil containing the same which comprises contacting said oil with between about 2 and about 80 moles of hydrogen per mole of hydrocarbon at a temperature between about 400 and about 1400° F. in a primary contact zone containing a crystalline molecular sieve material having uniform pore openings of between about 4 and about 6 Angstroms in diameter and having encased within its crystal structure between about 1 and about 60 weight percent of iodine, passing the effluent stream from said primary contact zone to a secondary contact zone containing a crystalline molecular sieve material initially free of iodine, having uniform pore openings of between about 4 and about 6 Angstroms in diameter and maintained at a temperature between about 50 and about 300° F., whereby iodine-containing effluent in the stream from said primary zone is adsorbed on the molecular sieve material in said secondary contact zone upon passage therethrough, maintaining the aforesaid contacting conditions until the iodine contained in the molecular sieve materials of said primary and secondary contact zones respectively reach a predetermined minimum and maximum content, thereafter, reversing the flow of the hydrocarbon oil charge and hydrogen and the conditions of temperature initially present in said primary zone and said secondary zone and repeating the aforesaid cyclic operation to afford a continuous yield of upgraded hydrocarbon oil product.

11. A continuous cyclic process for removing sulfur from a hydrocarbon oil containing the same which comprises contacting said oil with between about 2 and about 80 moles of hydrogen per mole of hydrocarbon at a temperature between about 400 and about 1400° F. in a primary contact zone containing a molecular sieve material having uniform pore openings of between about 8 and about 10 Angstroms in diameter and having encases within its crystal structure between about 1 and about 60 weight percent of iodine, passing the effluent stream from said primary contact zone to a secondary contact zone containing a crystalline molecular sieve material having uniform pore openings of between about 8 and about 10 Angstroms in diameter, initially free of iodine and maintained at a temperature between about 50 and about 300° F., whereby iodine-containing effluent in the stream from said primary zone is adsorbed on the molecular sieve material in said secondary contact zone upon passage therethrough, maintaining the aforesaid contacting conditions until the iodine contained in the molecular sieve materials of said primary and secondary contact zones respectively reach a predetermined minimum and maximum content, thereafter reversing the flow of the hydrocarbon oil charge and hydrogen and the conditions of temperature initially present in said primary zone and said secondary zone and repeating the aforesaid cyclic operation to afford a continuous yield of upgraded hydrocarbon oil product.

12. A continuous cyclic process for upgrading a hydrocarbon which comprises contacting the same with between about 2 and about 80 moles of hydrogen per mole of hydrocarbon at a temperature between about 400 and about 1400° F., a pressure between about 50 and about 5000 p.s.i.g., and a liquid hourly space velocity between about 1.0 and about 10 in a primary contact zone containing a crystalline molecular sieve material having encased within its crystal structure between about 1 and about 60 weight percent of iodine, passing the effluent stream from said primary contact zone to a secondary contact zone containing a crystalline molecular sieve material initially free of iodine and maintained at a temperature between about 50 and about 300° F. and a pressure between about 50 and about 5000 p.s.i.g. whereby iodine-containing effluent in the stream from said primary zone is adsorbed on the molecular sieve material in said secondary contact zone upon passage therethrough maintaining the aforesaid contacting conditions until the iodine contained in the molecular sieve materials of said primary and secondary contact zones respectively reach a predetermined minimum and maximum content thereafter reversing the flow of the hydrocarbon oil charge and hydrogen and the conditions of temperature and pressure initially present in said primary zone and said secondary zone and repeating the aforesaid cyclic operation to afford a continuous yield of upgraded hydrocarbon oil product.

13. The process of claim 12 wherein the molecular sieve material is a crystalline aluminosilicate characterized by an effective uniform pore diameter of between about 4 and about 15 Angstrom units.

14. The process of claim 12 wherein the molecular sieve material contained in the primary and secondary contact zones is characterized by substantially the same effective uniform pore diameter.

15. A continuous cyclic process for upgrading an oxygen-containing hydrocarbon oil which comprises contacting the same with between about 2 and about 80 moles of hydrogen per mole of hydrocarbon at a temperature between about 400 and about 1400° F., a pressure between about 50 and about 5000 p.s.i.g. and a liquid hourly space velocity of between about 0.1 and about 10 in a primary contact zone containing a crystalline molecular sieve material having encased within its crystal structure between about 1 and about 60 percent by weight of iodine, passing the effluent stream from said primary contact zone to a secondary contact zone containing a crystalline molecular sieve material initially free of iodine and maintained at a temperature below the boiling point of water and a pressure between about 50 and about 5000 p.s.i.g., whereby iodine-containing effluent and oxygen in the form of water in the stream from said primary zone are adsorbed on the molecular sieve material in said secondary contact zone upon passage therethrough, intermittently exposing the molecular sieve material in said secondary contact zone to a stream of hot drying gas to remove adsorbed water therefrom, maintaining the aforesaid contact conditions until the iodine contained in the molecular sieve materials of said primary and secondary contact zones respectively reach a predetermined minimum and maximum content, thereafter reversing the flow of the hydrocarbon oil charge and hydrogen and the conditions of temperature and pressure initially present in said primary zone and said secondary zone and repeating the aforesaid cyclic operation to afford a continuous yield of upgraded hydrocarbon oil product.

16. A continuous cyclic process for hydroprocessing a hydrocarbon oil which comprises contacting the same at a temperature between about 400 and about 1400° F. in a primary contact zone containing a crystalline molecular sieve material having bromine encased within its crystal structure, passing the effluent stream from said primary contact zone to a secondary contact zone containing a crystalline molecular sieve material initially free of bromine and maintained at a temperature between about 50 and about 300° F., whereby bromine-containing effluent in the stream from said primary zone is adsorbed on the molecular sieve material in said secondary contact zone upon passage therethrough, maintaining the aforesaid contacting conditions until the bromine contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

17. A continuous cyclic process for hydroprocessing a hydrocarbon oil which comprises contacting the same at a temperature between about 400 and about 1400° F. in a primary contact zone containing a crystalline molecular sieve material having selenium encased within its crystal structure, passing the effluent stream from said primary contact zone to a secondary contact zone containing a crystalline molecular sieve material initially free of selenium and maintained at a temperature between about 50 and about 300° F., whereby selenium-containing effluent in the stream from said primary zone is adsorbed on the molecular sieve material in said secondary contact zone upon passage therethrough, maintaining the aforesaid contacting conditions until the selenium contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

18. A continuous cyclic process for hydroprocessing a hydrocarbon oil which comprises contacting the same at a temperature between about 400 and about 1400° F. in a primary contact zone containing a crystalline molecular sieve material having sulfur encased within its crystal structure, passing the effluent stream from said primary contact zone to a secondary contact zone containing a crystalline molecular sieve material initially free of sulfur and maintained at a temperature between about 50 and about 300° F., whereby sulfur-containing effluent in the stream from said primary zone is adsorbed on the molecular sieve material in said secondary contact zone upon passage therethrough, maintaining the aforesaid contacting conditions until the sulfur contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

19. A continuous cyclic process for hydroprocessing a hydrocarbon oil which comprises contacting the same at a temperature between about 400 and about 1400° F. in a primary contact zone containing a crystalline molecular sieve material having Friedel-Craft type catalyst encased within its crystal structure, passing the effluent stream from said primary contact zone to a secondary contact zone containing a crystalline molecular sieve material initially free of Friedel-Craft type catalyst and maintained at a temperature between about 50 and about 300° F., whereby Friedel-Craft type catalyst-containing effluent in the stream from said primary zone is adsorbed on the molecular sieve material in said secondary contact zone upon passage therethrough, maintaining the aforesaid contacting conditions until the Friedel-Craft type catalyst contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

20. A continuous cyclic process for hydroprocessing a hydrocarbon oil which comprises contacting the same at a temperature between about 400 and about 1400° F. in a primary contact zone containing a crystalline molecular sieve material having tellurium encased within its crystal structure, passing the effluent stream from said primary contact zone to a secondary contact zone containing a crystalline molecular sieve material initially free of tellurium and maintained at a temperature between about 50 and about 300° F., whereby tellurium-containing effluent in the stream from said primary zone is adsorbed on the molecular sieve material in said secondary contact zone upon passage therethrough, maintaining the aforesaid contacting conditions until the tellurium contained in the molecular sieve materials of said primary and secondary contact zones respectively reach a predetermined minimum and maximum content, thereafter reversing the flow of the hydrocarbon oil charge and hydrogen and the temperature conditions initially present in said primary zone and said secondary zone and repeating the aforesaid cyclic operation to afford a continuous yield of upgraded hydrocarbon oil product.

References Cited by the Examiner

UNITED STATES PATENTS

| | | | |
|---|---|---|---|
| 2,270,058 | 1/1942 | Jones | 260—676 |
| 2,729,590 | 1/1956 | Bishop et al. | 208—241 |
| 2,768,121 | 10/1956 | Denton et al. | 208—241 |
| 2,925,380 | 2/1960 | Fleck et al. | 208—254 |

DELBERT E. GANTZ, *Primary Examiner.*

ALPHONSO D. SULLIVAN, *Examiner.*

S. P. JONES, *Assistant Examiner.*